(12) United States Patent
Kappes et al.

(10) Patent No.: US 7,583,961 B2
(45) Date of Patent: Sep. 1, 2009

(54) METHOD AND APPARATUS FOR GENERATING A SIGNAL STRENGTH MODEL FOR AN ACCESS POINT AT AN ARBITRARY LOCATION

(75) Inventors: Martin Kappes, Bridgewater, NJ (US); Anjur S. Krishnakumar, Rocky Hill, NJ (US); P. Krishnan, North Plainfield, NJ (US)

(73) Assignee: Avaya Inc., Basking Ridge, NJ (US)

( * ) Notice: Subject to any disclaimer, the term of this patent is extended or adjusted under 35 U.S.C. 154(b) by 385 days.

(21) Appl. No.: 10/834,291

(22) Filed: Apr. 28, 2004

(65) Prior Publication Data

US 2005/0245252 A1 Nov. 3, 2005

(51) Int. Cl.
*H04Q 7/20* (2006.01)
(52) U.S. Cl. .................. 455/423; 342/463
(58) Field of Classification Search ............. 455/423; 342/463
See application file for complete search history.

(56) References Cited

U.S. PATENT DOCUMENTS

| 5,987,328 A | 11/1999 | Ephremides et al. |
| 6,674,403 B2 * | 1/2004 | Gray et al. .................. 342/463 |

FOREIGN PATENT DOCUMENTS

| EP | 0 903 880 A2 | 3/1999 |
| WO | WO 02/49384 A | 6/2002 |
| WO | WO 02/073997 A1 | 9/2002 |

OTHER PUBLICATIONS

H. Akima, "A New Method of Interpolation and Smooth Curve Fitting Based on Local Procedures," Journal of the ACM, vol. 17, No. 4, 589-602 (Oct. 1970).*
T. Hastie and R. Tibshirani, "Generalized Additive Models," Chapman and Hall (1990).*
H. Akima, "Algorithm 761: Scattered-Data Surface Fitting that has the Accuracy of Cubic Polynomial," ACM Transactions on Mathematical Software, vol. 22, No. 3, 362-71 (Sep. 1996).*
H. Akima, "Algorithm 760: Rectangular-Grid-Data Surface Fitting that has the Accuracy of Bi-cubic Polynomial," ACM Transactions on Mathematical Software, vol. 22, No. 3, 357-61 (Sep. 1996).*

(Continued)

*Primary Examiner*—Lester Kincaid
*Assistant Examiner*—Charles Shedrick
(74) *Attorney, Agent, or Firm*—Ryan, Mason & Lewis LLP

(57) ABSTRACT

A method and apparatus are provided for obtaining a signal strength model for an access point at an arbitrary location, q, at a site. Signal strength measurements are obtained for each of n sampling points; the signal strength received at the arbitrary location, q, is computed from each of the sampling points (for example, using reciprocity principles); signal strength estimates corresponding to the signal received at the sampling points from the arbitrary location are computed; and a signal strength model is determined for an access point positioned at the arbitrary location, q.

17 Claims, 5 Drawing Sheets

OTHER PUBLICATIONS

Butterworth et al., "Base Station Placement for In-Building Mobile Communications Systems to Yield High Capacity and Efficiency," IEEE Transactions on Communications, vol. 48, No. 4, pp. 658-669 (Apr. 2000).

Seidel et al., "914 MHz Path Loss Predicition Models for Indoor Wireless Communications in Multifloored Buildings," IEE Transactions on Antennas and Propagation, vol. 40, No. 2., pp. 207-217 (Feb. 1992).

Seidel et al., "Site-Specific Propagation Prediction of Wireless In-Building Personal Communication System Design," IEEE Transaction Vehicular Technology, Vo. 43, No. 4, pp. 879-891 (Nov. 1994).

Butterworth et al., "Implications of Propagation Modeling on the Design of a DS-CDMA In-Building Mobile Communication System," in Proc. $47^{th}$ Vehicular Technology Conference, Phoenix, AZ, pp. 1420-1424 (1997).

Krishnan et al., "A System for LEASE: Location Estimation Assisted by Stationary Emitters for Indoor RF Wireless Networks," in Proc. of IEEE Infocom 2004, (Mar. 2004).

Seidel et al., "A Ray Tracing Technique to Predict Path Loss and Delay Spread Inside Buildings," in Proc. of $42^{nd}$ Vehicular Technology Conference, pp. 649-653 (1992).

R. A. Valenzuela, "A Ray Tracing Approach to Predicting Indoor Wireless Transmission," in Proc. of $43^{rd}$ Vehicular Technology Conference, pp. 214-218 (1993).

Hills et al., "Estimating Signal Strengths in the Design of an Indoor Wireless Network," IEEE Transactions on Wireless Communications, vol. 3, No. 1 (Jan. 2004).

Ganu et al., "Infrastucture-based Location Estimation in WLAN Networks," Proceedings of the IEEE Wireless Communications and Networking Conference (WCNC) (Mar. 2004). (An earlier version appears as Avaya Technical Report, ALR-2003-053 (Oct. 2003).

Krishnan et al., "A System for LEASE: System for Location Estimation Assisted by Stationary Emitters for Indoor RF Wireless Networks," Proceedings of IEEE Infocom 2004 (Mar. 2004).

Krishnan et al., "A system for LEASE: Location estimation assisted by stationary emitters assisted for indoor RF wireless networks", INFOCOM, IEEE Conference, Hong Kong, vol. 2, pp. 1001-1011, Mar. 7, 2004.

, "CN Application No. 200510062987.0 Office Action", Jun. 27, 2008, Publisher: The Patent Office of the People's Republic of China, Published in: CN.

Danielidis, Simon, "EP Application No. 05251223.3 Search Report", Aug. 5, 2008, Publisher: EPO, Published in: EP.

Kappes et al., "Estimating Signal Strength Coverage for a Wireless Access Point", "IEEE Globecom", 2004, pp. 3264-3269, Publisher: IEEE Communications Society, IEEE Xplore, Published in: US.

Nakamoto, J., "JP Application No. 2005-128794 Office Action", Dec. 3, 2008, Publisher: Japan Patent Office, Published in: JP.

* cited by examiner

US 7,583,961 B2

METHOD AND APPARATUS FOR GENERATING A SIGNAL STRENGTH MODEL FOR AN ACCESS POINT AT AN ARBITRARY LOCATION

FIELD OF THE INVENTION

The present invention relates generally to techniques for determining the placement of wireless access points (APs) in a wireless network, and more particularly, to methods and apparatus for estimating the signal strength coverage for a wireless access point.

BACKGROUND OF THE INVENTION

Wireless networks, such as wireless local area networks (WLANs) based on the IEEE 802.11 standard, have been widely deployed in many enterprises, primary to provide wireless data access from portable devices, such as laptop computers and personal digital assistants (PDAs), to the wired infrastructure of the enterprise. If an infrastructure-mode wireless LAN is to be deployed in a specific area, e.g., an enterprise facility, it is necessary to appropriately place wireless access points to which terminals associate. Since the coverage range of a single access point is limited, typical installations in enterprises consist of multiple access points. Since bad signal reception leads to unacceptable network behavior, such as insufficient overall throughput, adequate signal coverage throughout the area must be ensured.

A number of techniques have been proposed or suggested for determining the placement of access points for a wireless network. An important aspect of such techniques is determining the expected signal strength coverage of an access point if it were to be placed at a specified location at the site. Typically, such tools estimate signal strength coverage given an expected location for an access point based on an analytical radio propagation model. The model takes into account radio signal propagation, augmented with information about the number of walls and other obstructions in the signal path, as well as the material and other characteristics of the obstructions. This typically requires a detailed floor plan of the building with information about signal reflectors and obstructors in the floor plan.

U.S. patent application Ser. No. 10/776,058, filed Feb. 11, 2004, entitled "Estimating the Location of Inexpensive Wireless Terminals by Using Signal Strength Measurements," assigned to the assignee of the present invention, and incorporated by reference herein, discloses a technique for determining the placement of wireless access points that (i) uses actual signal measurements, and (ii) requires no explicit knowledge of signal reflectors and obstructors. See also, P. Krishnan et al., "A System for LEASE: System for Location Estimation Assisted by Stationary Emitters for Indoor RF Wireless Networks," Proc. of IEEE Infocom 2004 (March, 2004), incorporated by reference herein. In particular, a technique is disclosed for constructing a signal strength model for an existing access point, based on actual signal strength measurements of this access point at several sampling points. The signal strength model can then be used to predict the estimated signal strength from the access point at any point of the site.

A need exists for methods and apparatus for predicting the signal strength coverage of a wireless access point, given its desired location at a site. A further need exists for methods and apparatus for constructing a signal strength model without having actual measurements for the access point. In other words, a need exists for methods and apparatus for constructing a signal strength model for an access point at a random location within a site, without placing a real access point at the desired location and obtaining measurements.

SUMMARY OF THE INVENTION

Generally, a method and apparatus are provided for obtaining a signal strength model for an access point at an arbitrary location, q, at a site. Signal strength measurements are obtained for each of n sampling points; the signal strength received at the arbitrary location, q, is computed from each of said sampling points (for example, using reciprocity principles); signal strength estimates corresponding to the signal received at the sampling points from the arbitrary location are computed; and a signal strength model is determined for an access point positioned at the arbitrary location, q.

The signal strength model can be determined, for example, by smoothing the obtained signal strength measurements into a set (for example, using a generalized additive model (GAM)); dividing the site into a grid of squares of known size; and interpolating the set across two dimensions (for example, using an Akima spline interpolation) to form a scalar array to estimate the received signal strength at the center of each grid square. The scalar array comprises the signal strength model for an access point positioned at the arbitrary location, q.

In a variation of the invention that does not rely on reciprocity principles, a signal strength model is obtained for an access point at an arbitrary location, q, at a site by (i) obtaining signal strength measurements for each of n sampling points; for each sampling point, (ii) generating a model for the signal strength received at the sampling point when the access point is placed at an arbitrary location, q; (iii) computing a signal strength received at the n sampling points when the access point is placed at the arbitrary location, q; and (iv) determining the signal strength model for the access point positioned at the arbitrary location, q.

A more complete understanding of the present invention, as well as further features and advantages of the present invention, will be obtained by reference to the following detailed description and drawings.

DETAILED DESCRIPTION

The present invention provides a new non-parametric modeling technique for constructing a signal strength model for an access point at a random location within a site, without placing a real access point at the desired location and obtaining measurements. The present invention obtains sample measurements from several fixed access points in a novel way to compute a signal coverage model for an access point at a random location. The disclosed signal strength model automatically takes into account the signal strength propagation characteristics of the site and also allows for an efficient deployment methodology.

Figure 1:
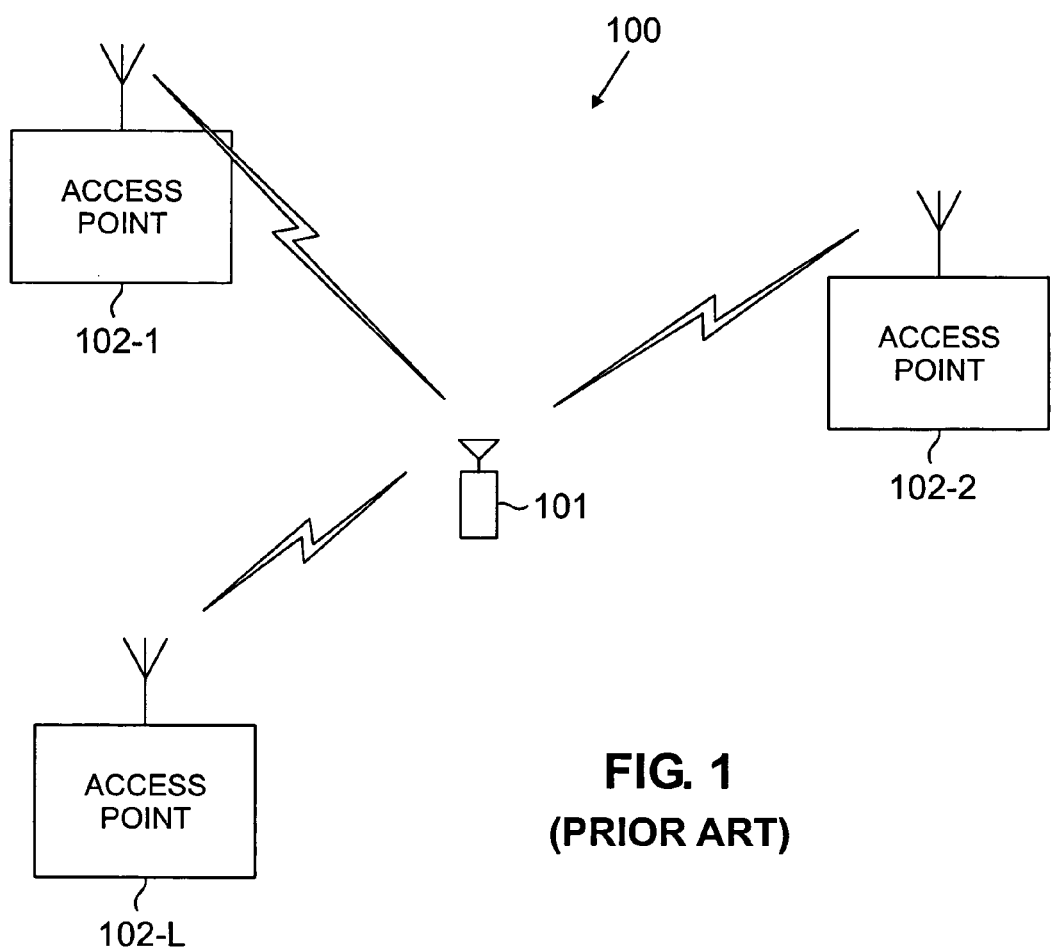
FIG. 1 illustrates a wireless network environment in which the present invention can operate.

FIG. 1 illustrates a conventional wireless network environment 100 in which the present invention can be employed. As shown in FIG. 1, the wireless network environment 100 comprises a wireless device 101 and access points 102-1 through 102-L. Wireless device 101 uses the access points 102 to exchange blocks of data, or packets, with other devices, such as servers that are external to the wireless network 100. At any given time, the wireless device 101 is associated with one of the access points 102 for the purpose of communicating with another device.

Signal Strength Estimation for Actual Access Point Location

As previously indicated, U.S. patent application Ser. No. 10/776,058, filed Feb. 11, 2004, entitled "Estimating the Location of Inexpensive Wireless Terminals by Using Signal Strength Measurements," discloses a modeling technique for constructing a signal strength model for an existing access point based on actual signal strength measurements of this access point at some sampling points.

Figure 2:
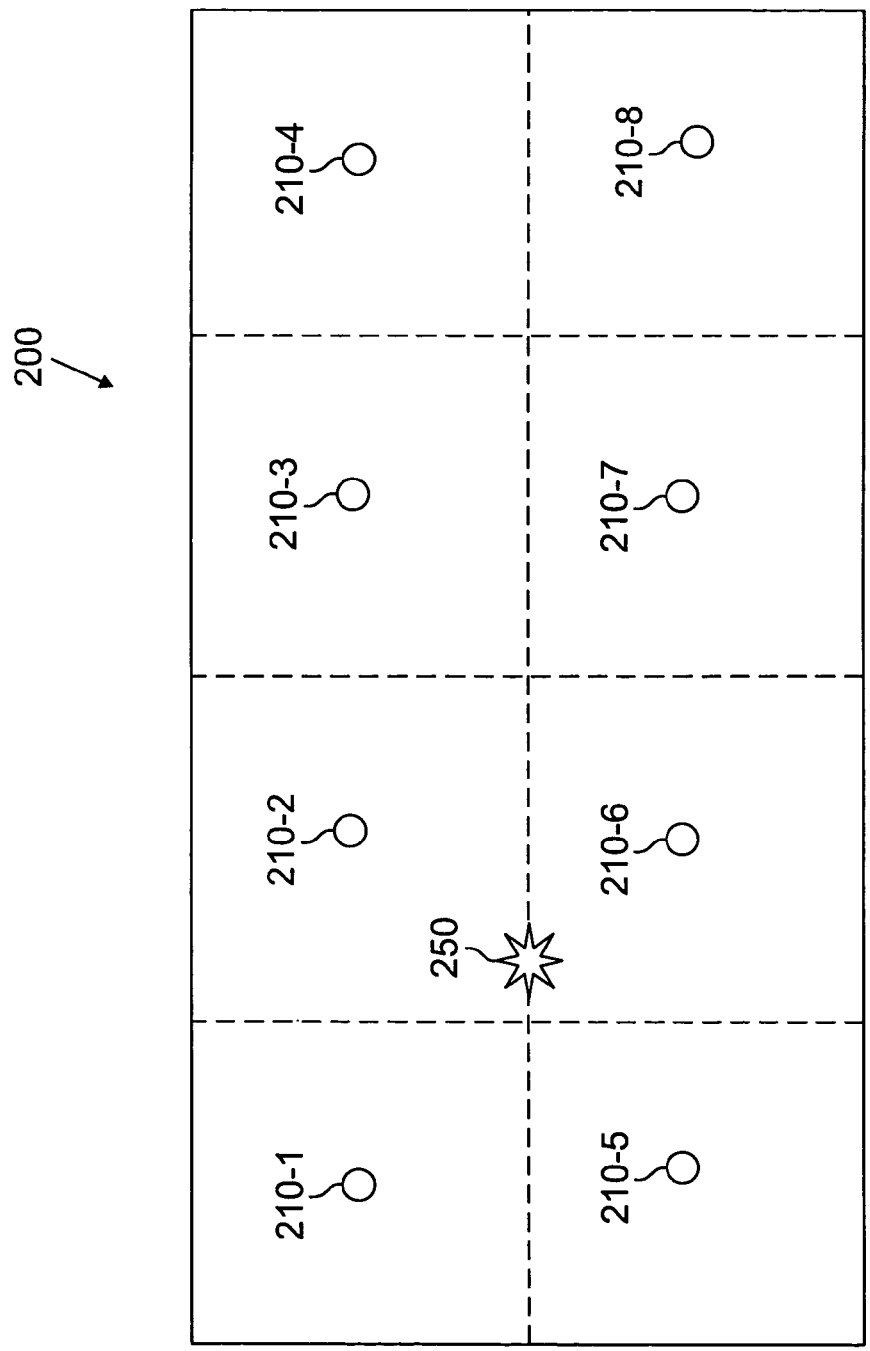
FIG. 2 is a schematic diagram illustrating a floor plan of an exemplary site in accordance with a conventional signal strength estimation technique.

Generally, the disclosed signal strength modeling technique uses samples of received signal strength of the access point from a number of sampling points $p_1, \ldots, p_n$ within a site. FIG. 2 is a schematic diagram illustrating a floor plan of an exemplary site 200. As shown in FIG. 2, for a fixed location of an access point 250, the signal strength is measured of the access point at each of the n sample locations 210-1 through 210-8 (n is 8 in the exemplary embodiment shown in FIG. 2). The received signal strength is evaluated by either using a sniffer to record signal strength on received packets (e.g., beacons) from the access point 250, or making the access point 250 transmit a packet by specifically probing the access point 250. Typically, the sampling points are uniformly distributed throughout the site 200.

The obtained signal strength measurements are then optionally smoothed using a technique based on generalized additive models, for example, as described in T. Hastie and R. Tibshirani, "Generalized Additive Models," Chapman and Hall (1990). The smoothed signal strength values are then interpolated, e.g., using Akima splines, as described, for example, in H. Akima, "Algorithm 761: Scattered-Data Surface Fitting that has the Accuracy of Cubic Polynomial," ACM Transactions on Mathematical Software, Vol. 22, No. 3, 362-71 (September, 1996); H. Akima, "Algorithm 760: Rectangular-Grid-Data Surface Fitting that has the Accuracy of Bicubic Polynomial," ACM Transactions on Mathematical Software, Vol. 22, No. 3, 357-61 (September 1996); H. Akima, "A New Method of Interpolation and Smooth Curve Fitting Based on Local Procedures," Journal of the ACM, Vol. 17, No. 4, 589-602 (October 1970). Generally, Akima spline interpolation does a bivariate interpolation and is a local, triangle-based technique with many desirable properties including local containment of discontinuities.

Let A denote the area of interest and let S represent the set of all possible signal strength values. The procedure described above builds a model for an access point at location $q \in$ in A using signal strength measurements sampled at points $P=\{p_1, \ldots, p_n\} \subseteq A$. Let $Q=\{(s_1,p_1), \ldots, (s_n,p_n)\}$, where $s_i$ is the signal strength measured at point $p_i$, $1 \leq i \leq n$. The interpolation-based method yields a function (model), $E_q^Q: A \rightarrow S$, that maps each point in the area of interest to a signal strength value obtained via smoothing and interpolation from the input measurements Q. As used herein, the notation $E_q^X$ denotes the model where q denotes the location of the access point and q and X taken together in context describe the measurement set used as input. For example, in the above case $E_q^P$ denotes the model.

The model can then be used to predict the estimated signal strength from the access point at any point on the floor of the site, in accordance with the present invention.

Estimating Signal Strength for Access Point at Arbitrary Location

The above technique provides a signal strength model for an access point if actual samples of signal strength for the access point are available. Since the sample signal strength measurements at points $p_1, \ldots, p_n$ were for signal strengths from an access point at a specific location 250, they can only be used to compute a model for an access point at this location.

The present invention provides a technique for generating a model without having actual measurements for an access point. In other words, the present invention generates a model for an access point at a random location without placing a real access point at the desired location and taking measurements.

According to one aspect of the invention, a signal strength model is generated by placing access points (transceivers) at specific locations and collecting signal strength samples of these access points. These samples are then used to build signal strength models for each of these access points using the method outlined above for estimating the signal strength for an access point at a known location. Then, the models for these access points are used collectively to build a model for a hypothetical access point at another potential location.

Figure 3:
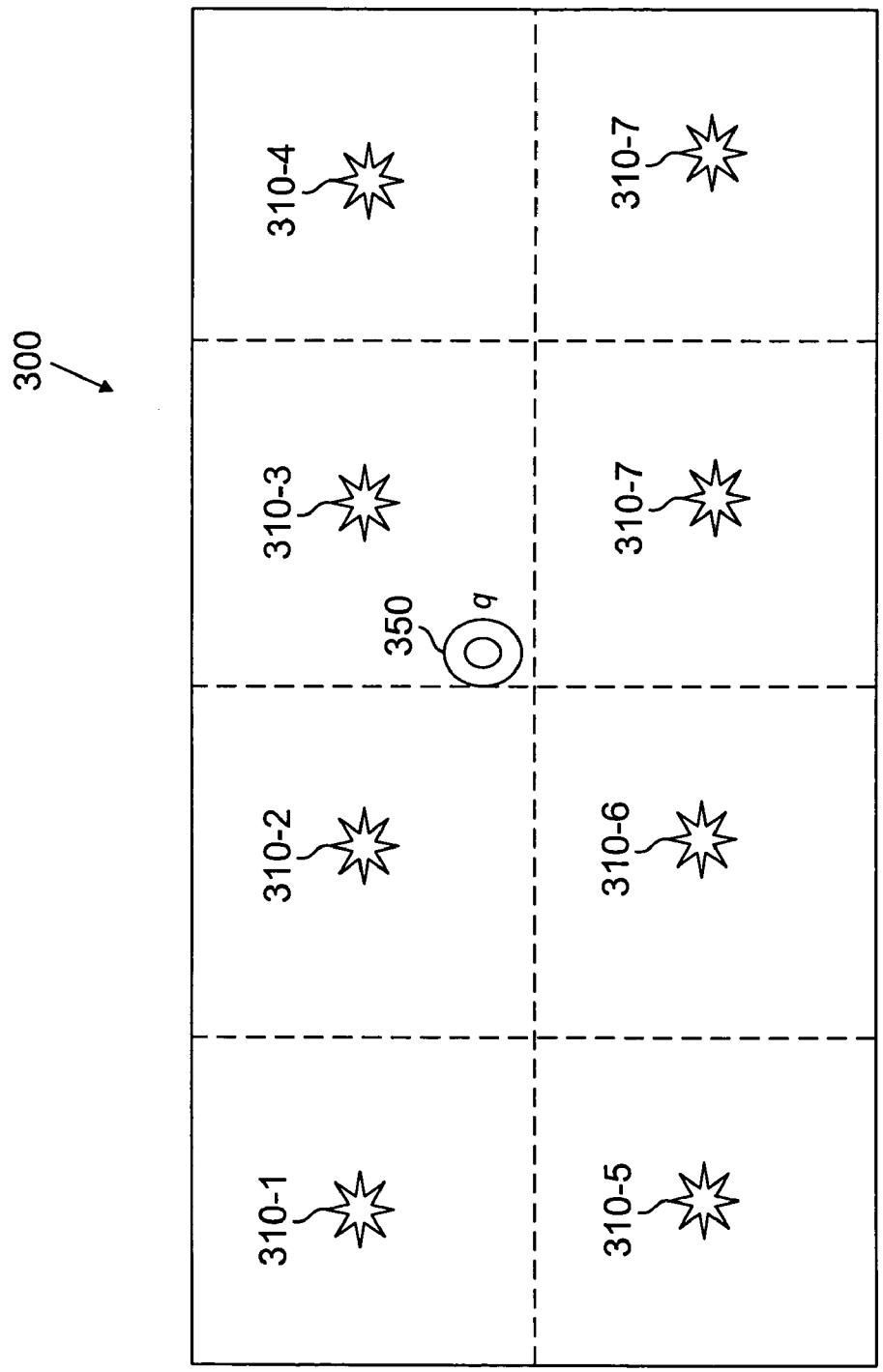
FIG. 3 is a schematic diagram illustrating a floor plan of an exemplary site in which the present invention can estimate the signal strength for an access point having an arbitrary location.

FIG. 3 is a schematic diagram illustrating a floor plan of an exemplary site 300. As shown in FIG. 3, the signal strength is measured by placing access points at specific locations 310-1 through 310-8 (n is 8 in the exemplary embodiment shown in FIG. 3). The present invention provides a technique for estimating the signal strength model for a possible location 350 of an access point.

Assume that the sampling locations $P=\{p_i, \ldots, p_n\}$ are on the floor of the site 300 as described above, and access points are placed at all these locations. Furthermore, signal strength measurements are sampled and collected from all these n access points at each location $p_i$, $1 \leq i \leq n$. Thus, an n×n matrix M of signal strengths is obtained, where M(i, j) specifies the signal strength measured at location $p_i$ from the access point at location $p_j$. The previous section described a method for building a signal propagation model $E_{p_j}^P$ for the access point at location $p_j$ by using the column $M(\cdot, j)$ of matrix M. This model provides an estimated signal strength $E_{p_j}^P(r)$ at point r. Since the model is built using actual sampling of signal strengths, it takes into account the building characteristics of the site automatically.

To estimate the signal strength model for a hypothetical access point at a location, principles of reciprocity can be used. Consider two transceivers, one each at $r_1$ and $r_2$ that transmit with the same power, excluding any antenna gain. At any given instant, the signal strength from transceiver $r_1$ acting as a transmitter as measured by the transceiver at $r_2$ acting as a receiver is the same as that measured at point $r_1$, with transceiver at $r_1$ acting as a receiver, and transceiver at $r_2$ acting as a transmitter. In practice, the two measurements are not simultaneous, and signal variation with time may imply that reciprocity in measurements is not always exact, but approximate. Therefore, the matrix M should be almost symmetric, i.e., M(i, j)≈M(j, i), due to the expected approximate reciprocity of measured signal strength.

The process of obtaining the signal strength model for the hypothetical ("test") access point 350 (FIG. 3) at point q is considered. It is again noted that the access point does not exist at point q physically, but the signal strength propagation model is desired if an access point were to be placed at point q. From the above discussion, it is known that if the measured signal strengths were obtained from point q at each of the sampling points, a signal strength model can be constructed for an access point at point q.

The signal strength models for the actual access points and the reciprocity principle are leveraged to estimate the signal strength that would be measured at each of the sampling points from an access point at q by $E_{p_j}^P(q) 1 \leq j \leq n$. This provides n signal strength estimates from an access point at point q at the sampling points $p_1, \ldots, p_n$ which are used as input $\{(E_{p1}^P(q), p_1), \ldots, (E_{pn}^P(q), p_n)\}$ for the interpolation-based technique outlined above for a known location. Thus, a synthesized model is obtained for an access point at point q, denoted by $E_q^s$.

In a variation of the present invention, the above technique can be modified such that it does not use the reciprocity principle. Generally, models are first built by using the rows M(j,•) of matrix M (instead of the columns). Intuitively, these models capture the effect of moving an access point while fixing the location where signal strength is measured. These models can then be used collectively as before to build a model for a hypothetical access point at a location, as would be apparent to a person of ordinary skill in the art based on the present disclosure. Alternately, a pre-processing step can be introduced to transform the original measurement matrix M into a symmetrical matrix M', for instance by assigning M'(i, j)=M'(j, i)=f(M(i, j)=M(j, i)), where f is a function, such as a mean or minimum function.

Figure 4:
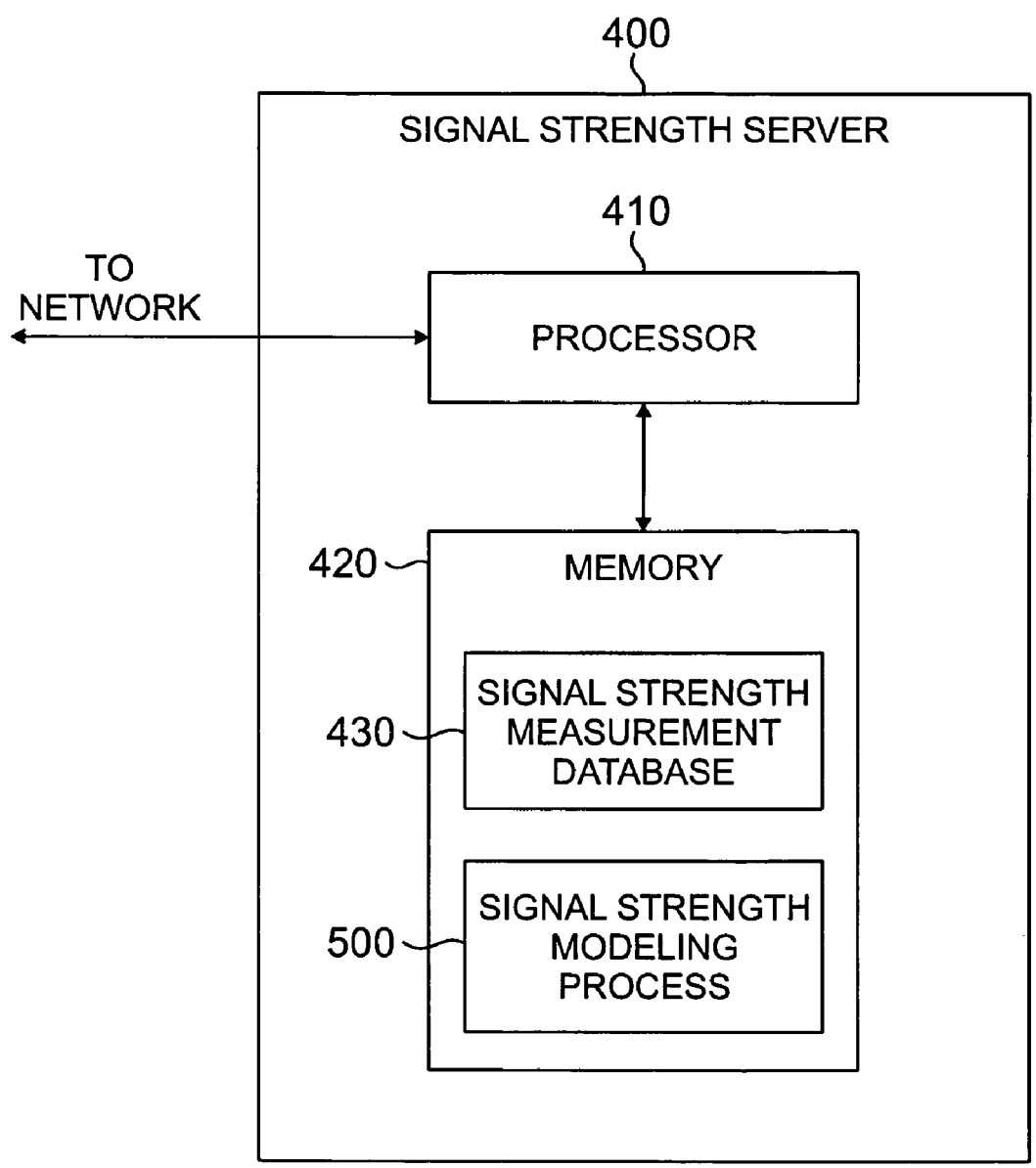
FIG. 4 is a schematic block diagram of an exemplary signal strength server incorporating features of the present invention.

FIG. 4 is a schematic block diagram of an exemplary signal strength server 400 incorporating features of the present invention. The signal strength server 400 may be any computing device, such as a personal computer, work station or server. As shown in FIG. 4, the exemplary signal strength server 400 includes a processor 410 and a memory 420, in addition to other conventional elements (not shown). The processor 410 operates in conjunction with the memory 420 to execute one or more software programs. Such programs may be stored in memory 420 or another storage device accessible to the signal strength server 400 and executed by the processor 410 in a conventional manner.

For example, the memory 420 may store a signal strength measurement database 430 that comprises, e.g., the n×n matrix M of measured signal strengths for the n sampling points $p_1, \ldots, p_n$. In addition, the memory 420 may store a signal strength modeling process 500, discussed below in conjunction with FIG. 5. Generally, the signal strength modeling process 500 processes the signal strength measurements obtained at n sampling points and synthesizes the input that would have been collected at an arbitrary point q to build a signal strength model for the arbitrary point q.

Figure 5:
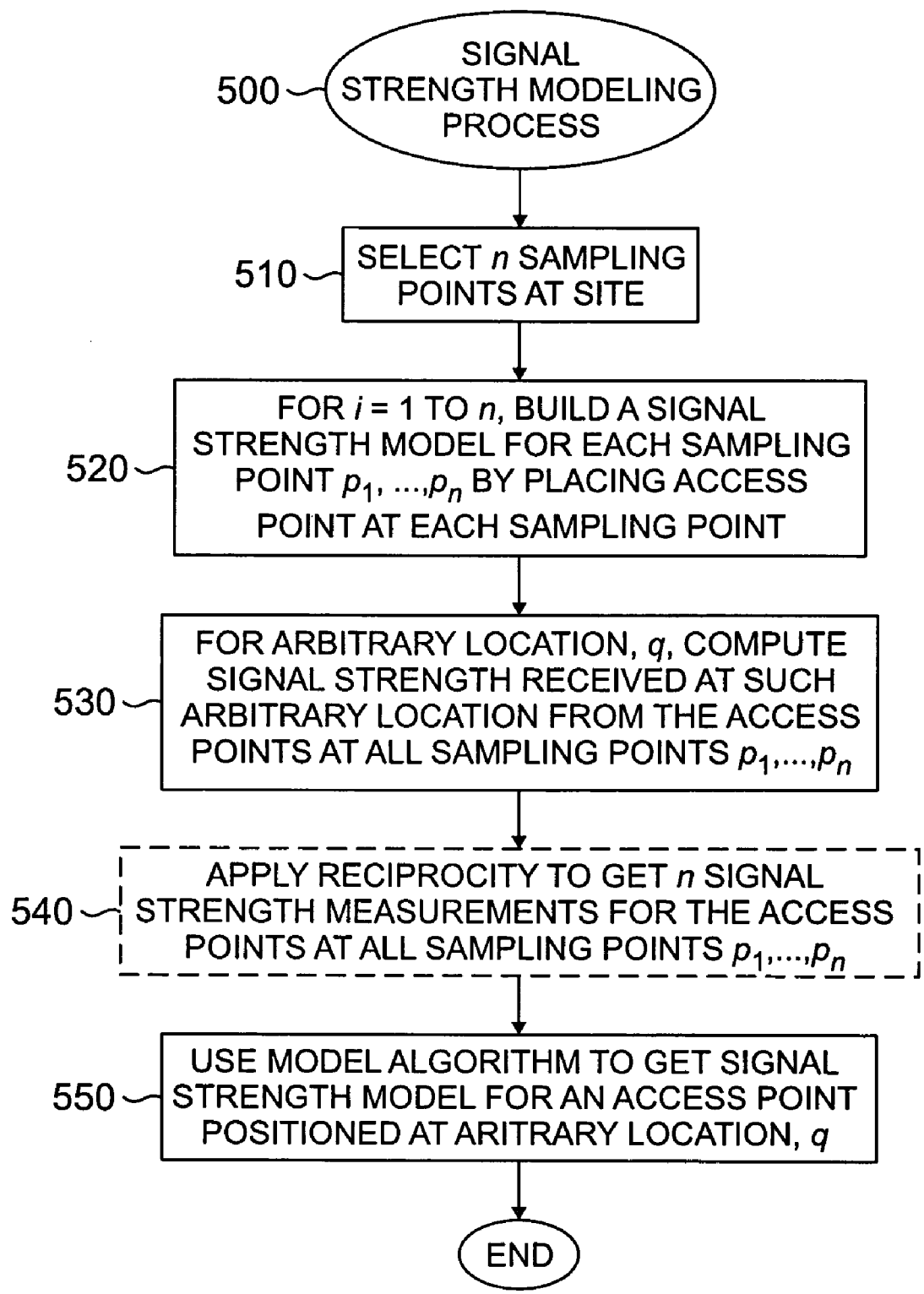
FIG. 5 is a flow chart describing an exemplary implementation of the signal strength modeling process of FIG. 4.

FIG. 5 is a flow chart describing an exemplary implementation of the signal strength modeling process 500. As shown in FIG. 5, the signal strength modeling process 500 initially selects n sampling points $p_1, \ldots, p_n$ at the site during step 510. Thereafter, for each of the n sampling points $p_1, \ldots, p_n$, a signal strength model is built during step 520 by placing an access point at each sampling point $p_1, \ldots, p_n$.

For the arbitrary location, q, the signal strength received at such arbitrary location is computed from the access points at all sampling points $p_1, \ldots, p_n$ during step 530. Reciprocity principles are optionally applied during step 540 to get n signal strength measurements corresponding to the access points at all sampling points $p_1, \ldots, p_n$. Finally, the model algorithm described above for fixed locations is applied during step 550 to get a signal strength model for an access point positioned at the arbitrary location, q.

For a detailed discussion of a suitable technique for generating a signal strength model, see, for example, U.S. patent application Ser. No. 10/776,058, filed Feb. 11, 2004, entitled "Estimating the Location of Inexpensive Wireless Terminals by Using Signal Strength Measurements," incorporated by reference herein Generally, a signal strength model can be generated during step 550 for an access point positioned at the arbitrary location, q, as follows, using the signal strength measurements that were synthesized during step 540:

smooth the synthesized signal strength measurements into a set, for example, using a generalized additive model (GAM);

divide the floor 300 into a grid of squares of known size; and interpolate (such as an Akima spline interpolation) the set across two dimensions to form a scalar array to estimate the received signal strength at the center of each grid square (i.e., the signal strength model for an access point positioned at the arbitrary location, q).

Exemplary Deployment Methodology

The present invention can be deployed, for example, using battery operated devices with small form factor that can wirelessly transmit and receive packets and measure received signal strength for applicable wireless technologies. Such devices are referred to as Wireless Auxiliary Receive/Transmit Stations (WARTS). Conceptually, the WARTS devices can send a stream of packets, receive packets from other wireless devices, and in particular, from other WARTS devices, and record signal strength for received packets. For location estimation, monitoring, and wireless security, sniffer/signal strength measurement devices can be used, such as those described in S. Ganu et al., "Infrastructure-Based Location Estimation in WLAN Networks," Proc. of IEEE Conference on Wireless Communications and Networking Conference 2004, Atlanta, Ga. (2004).

The WARTS devices can be affixed to appropriate locations at a site and powered up by the administrator. The WARTS devices could employ an appropriate protocol (e.g., using standard ad-hoc networking principles) to collect all necessary data automatically, in particular the matrix M described above. The collected data can then be used off-line. It is also possible to extend the technique to estimate characteristics other than basic signal strength as presented above. For example, the following estimations are possible: (i) measurements for several different access point transmit powers, (ii) observed data rate, and (iii) measurements for different wireless technologies, e.g., 802.11 a/b/g.

Article of Manufacture and System Considerations

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for obtaining a signal strength model for an access point at an arbitrary location, q, at a site, comprising:

a processor obtaining signal strength measurements for each of n sampling points; computing the signal strength received at said arbitrary location, q, from each of said sampling points without requiring said signal strength measurements for said arbitrary location, q; obtaining signal strength estimates corresponding to the signal received at said sampling points from said arbitrary location; and determining a signal strength model for an access point positioned at said arbitrary location, q, wherein said signal strength model does not require knowledge of a physical layout of said arbitrary location; wherein said step of determining a signal strength model further comprises the steps of: smoothing the obtained signal strength measurements into a set; dividing said site into a grid of squares of known size; and interpolating said set across two dimensions to form a scalar array to estimate said received signal strength at the center of each grid square.

2. The method of claim 1, wherein said scalar array comprises a signal strength model for an access point positioned at the arbitrary location, q.

3. The method of claim 1, wherein said step of smoothing employs a generalized additive model (GAM).

4. The method of claim 1, wherein said step of interpolating comprises an Akima spline interpolation.

5. The method of claim 1, wherein said step of obtaining signal strength measurements for each of n sampling points further comprises the step of placing a transceiver at each of said sampling points.

6. The method of claim 1, wherein said step of computing the signal strength received at said arbitrary location, q, from each of said sampling points applies reciprocity principles.

7. The method of claim 1, wherein said site is being evaluated for a deployment of a wireless network containing said access point.

8. An apparatus for obtaining a signal strength model for an access point at an arbitrary location, q, at a site, comprising: a memory; and at least one processor, coupled to the memory, operative to: obtain signal strength measurements for each of n sampling points; compute the signal strength received at said arbitrary location, q, from each of said sampling points without requiring said signal strength measurements for said arbitrary location, q; obtain signal strength estimates corresponding to the signal received at said sampling points from said arbitrary location; and determine a signal strength model for an access point positioned at said arbitrary location, q, wherein said signal strength model does not require knowledge of a physical layout containing said arbitrary location; wherein said processor is further configured to smooth the obtained signal strength measurements into a set; divide said site into a grid of squares of known size; and interpolate said set across two dimensions to form a scalar array to estimate said received signal strength at the center of each grid square.

9. The apparatus of claim 8, wherein said scalar array the signal strength model for an access point positioned at the arbitrary location, q.

10. The apparatus of claim 8, wherein said processor employs a generalized additive model (GAM) to implement said smoothing.

11. The apparatus of claim 8, wherein said processor employs an Akima spline interpolation.

12. The apparatus of claim 8, wherein said processor is further configured to apply reciprocity principles to compute the signal strength received at said arbitrary location, q, from each of said sampling points.

13. The apparatus of claim 8, wherein said site is being evaluated for a deployment of a wireless network containing said access point.

14. A method for obtaining a signal strength model for an access point at an arbitrary location, q, at a site, comprising: a processor obtaining signal strength measurements for each of n sampling points; for each sampling point, generating a model for the signal strength received at said sampling point when said access point is placed at an arbitrary location, q; computing a signal strength received at the n sampling points when said access point is placed at said arbitrary location, q, without requiring said signal strength measurements for said arbitrary location, q; and determining said signal strength model for said access point positioned at said arbitrary location, q, wherein said signal strength model does not require knowledge of a physical layout containing said arbitrary location; wherein said step of determining said signal strength model further comprises the steps of: smoothing the obtained signal strength measurements into a set; dividing said site into a grid of squares of known size; and interpolating said set across two dimensions to form a scalar array to estimate said received signal strength at the center of each grid square.

15. The method of claim 14, wherein said scalar array comprises a signal strength model for an access point positioned at the arbitrary location, q.

16. The method of claim 14, wherein said site is being evaluated for a deployment of a wireless network containing said access point.

17. The method of claim 14, wherein said sampling points have a fixed location.

* * * * *